United States Patent
Belenkii

(10) Patent No.: US 6,683,679 B2
(45) Date of Patent: Jan. 27, 2004

(54) OPTICAL FLOW MONITOR

(75) Inventor: Mikhail Belenkii, San Diego, CA (US)

(73) Assignee: Trex Enterprises Corporation, San Diego, CA (US)

( * ) Notice: Subject to any disclaimer, the term of this patent is extended or adjusted under 35 U.S.C. 154(b) by 0 days.

(21) Appl. No.: 10/155,094

(22) Filed: May 23, 2002

(65) Prior Publication Data

US 2003/0218738 A1 Nov. 27, 2003

(51) Int. Cl.$^7$ .............. G01B 9/02; G01P 3/36; A61B 5/02; G01F 1/00
(52) U.S. Cl. ............ 356/28.5; 356/28; 356/520; 600/538; 73/861
(58) Field of Search .............. 356/520, 28, 28.5; 600/538; 73/861

(56) References Cited

U.S. PATENT DOCUMENTS

| | | | | |
|---|---|---|---|---|
| 3,511,227 | A | * | 5/1970 | Johnson |
| 3,584,956 | A | * | 6/1971 | Hines et al. .............. 356/28 |
| 5,110,204 | A | * | 5/1992 | Miles et al. .............. 356/28 |
| 5,153,665 | A | * | 10/1992 | Weinstein .............. 356/28 |
| 5,170,060 | A | * | 12/1992 | Maillard et al. |
| 6,323,949 | B1 | * | 11/2001 | Lading et al. .............. 356/28.5 |
| 6,463,810 | B1 | * | 10/2002 | Liu .............. 73/861.63 |
| 6,468,222 | B1 | * | 10/2002 | Mault et al. .............. 600/538 |
| 6,532,061 | B2 | * | 3/2003 | Ortyn et al. .............. 356/28.5 |

* cited by examiner

*Primary Examiner*—Stephen C. Buczinski
(74) *Attorney, Agent, or Firm*—John R. Ross; John R. Ross, III

(57) ABSTRACT

An optical flow monitor. Fluid flow is determined by correlating two interference signals produced by coherent laser beams passing through a flowing fluid at two spaced-apart paths. The distance between the two paths is known and the correlation of the two signals is used to determine the time required for the fluid to flow between the two paths. In a preferred embodiment actually built and tested by Applicant the correlation is made by having an operator monitor on an oscilloscope the intensities of interference fringes corresponding to each of the two beam paths. Intensity variations in the interference fringes are caused by the same turbulent eddies passing each of the two paths. These turbulent eddies cause fluctuations in the index of refraction of the fluid which produce similar patterns on the oscilloscope which are separated on the oscilloscope time scale by an amount corresponding to the distance between the two beam paths and the flow rate of the fluid. The operator can determine the time difference between the similar patterns in the two beams and knowing the actual distance between the beams the operator can calculate the flow rate. In preferred embodiments the interference signals are produced using shear plates. In one preferred embodiment useful for monitoring the flow rate of a respirator, the correlation of the fringe intensity values corresponding to the two beam paths is made by a digital computer programmed with an algorithm for making cross correlation analyses that utilizes a fast Fourier transform.

13 Claims, 7 Drawing Sheets

V=4.5ℓ/min.

V=6.8ℓ/min.

V=16.8ℓ/min.

Inhale

Exhale

OPTICAL FLOW MONITOR

This invention relates to flow measurement and monitoring devices and in particular to optical flow monitoring devices.

BACKGROUND OF THE INVENTION

Accurate measurement and monitoring of fluid flow is important in many situations. One important application of fluid flow monitoring devices is the monitoring of respirator gas flow. Respiratory circuits are typically composed of flexible tubing with an inside diameter of 15 mm. The flow is bi-directional and peaks as high as 20 liters per minute. The gas mixture in the circuits typically contains $N_2$, $O_2$, $CO_2$, $N_2O$, ethanol, anesthetic and other drugs in varying concentrations. The concentration of all gases including $O_2$ varies from the inspired part of the cycle to the expired portion of the cycle. However, at least 21% $O_2$ is always present in the gas mixture in the circuit, and it generally has much higher concentrations of $O_2$. The $CO_2$ concentration is approximately zero on the inspired part of the cycle and as high as 10% on the expired portion of the cycle. Other gases may or may not be present in varying concentrations. Existing flow measuring products on the market include hot wire anemometer, fine mesh net, and pressure drop sensors. All of these products have as a principal shortcoming that they position an obstruction to the flow that creates a pressure drop in the flow channel. Cleaning of these devices is difficult. Ultrasonic anemometers are also known. Their principal shortcomings are that there are sensitive to gas composition and contaminations. Also, they are difficult to clean because they do not allow the use of a disposable or reusable flow measurement cuvette. Finally, they create pulsed pressure waves in the flow channel, and therefore cannot be placed close to the patient. Optical devices for measuring fluid flow are known. These include laser Doppler anemometers. These devices are expensive and they require seeding the flow with calibrated particles. In addition, they position obstruction in the flow channel.

What is needed is a very reliable and accurate, non-invasive, gas-independent, easy to clean, low cost and portable fluid flow measuring and monitoring device, which can be placed close to the patient.

SUMMARY OF THE INVENTION

The present invention provides an optical flow monitor. Fluid flow is determined by correlating two interference signals produced by coherent laser beams passing through a flowing fluid at two spaced-apart paths. The distance between the two paths is known and the correlation of the two signals is used to determine the time required for the fluid to flow between the two paths. In a preferred embodiment actually built and tested by Applicant the correlation is made by having an operator monitor on an oscilloscope the intensities of interference fringes corresponding to each of the two beam paths. Intensity variations in the interference fringes are caused by the same turbulent eddies passing each of the two paths. These turbulent eddies cause fluctuations in the index of refraction of the fluid which produce similar patterns on the oscilloscope which are separated on the oscilloscope time scale by an amount corresponding to the distance between the two beam paths and the flow rate of the fluid. The operator can determine the time difference between the similar patterns in the two beams and knowing the actual distance between the beams the operator can calculate the flow rate. In preferred embodiments the interference signals are produced using shear plates. In one preferred embodiment useful for monitoring the flow rate of a respirator, the correlation of the fringe intensity values corresponding to the two beam paths is made by a digital computer programmed with an algorithm for making cross correlation analyses that utilizes a fast Fourier transform. The invention is based on measurements of the flow of turbulent inhomogeneities in the fluid flow at two locations with a known separation. In preferred embodiments the turbulent inhomogeneities of the flow are increased by heating the fluid just upstream of the two beam paths. The flow velocity is estimated from the measured travel time, which is required for the flow to move turbulent eddies from one location to another, and the known separation between the two locations. The present invention provides a device that is purely optical and non-invasive and does not possess any significant obstruction to the flow. It creates no significant pressure drop and no pulsed pressure waves in the patient's airway and can be placed close to the patient, it is not sensitive to gas composition and contamination, it is easy to clean, because it uses a disposable or reusable flow measurement cuvette, and it is more accurate, rugged and reliable than existing sensors on the market.

DETAILED DESCRIPTION OF PREFERRED EMBODIMENTS

First Preferred Embodiment

Figure 1:
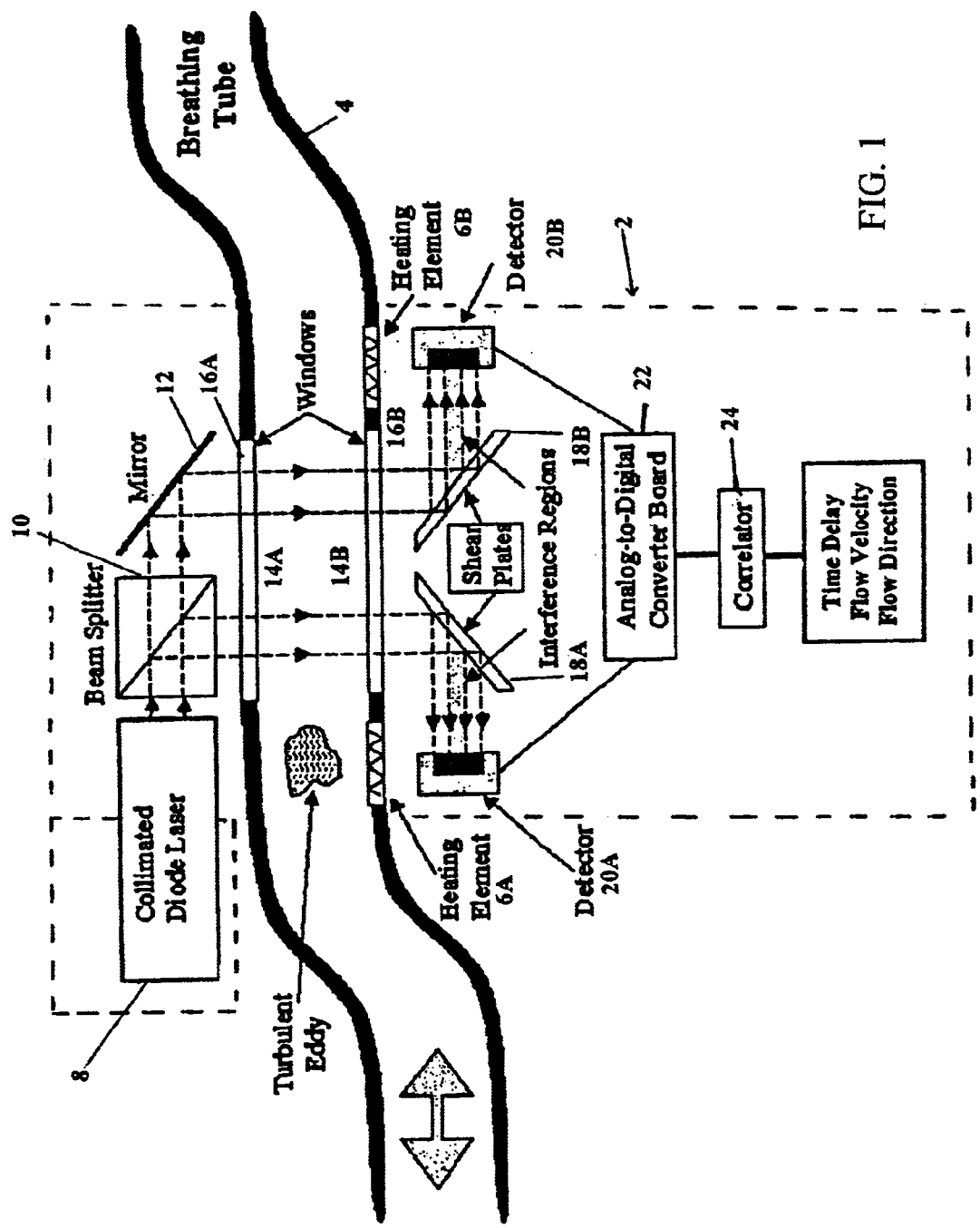
FIG. 1 is a drawing of a preferred embodiment of the present invention.
Figure 1A:
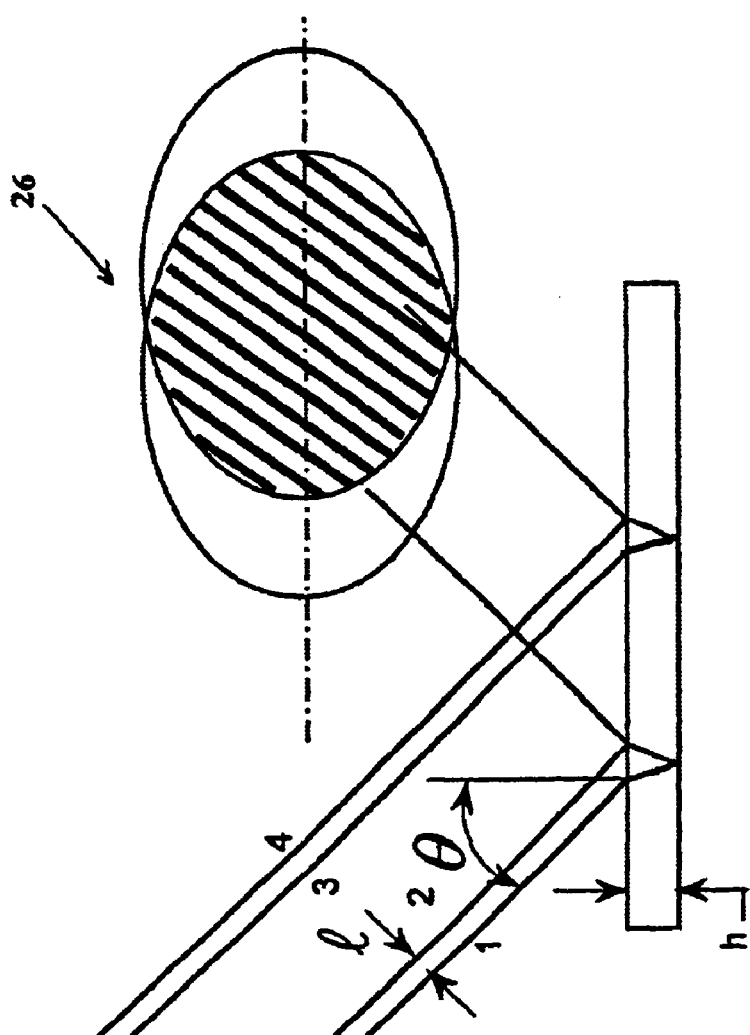
FIG. 1A shows how spectral fringes are produce with a shear plate.
Figure 6:
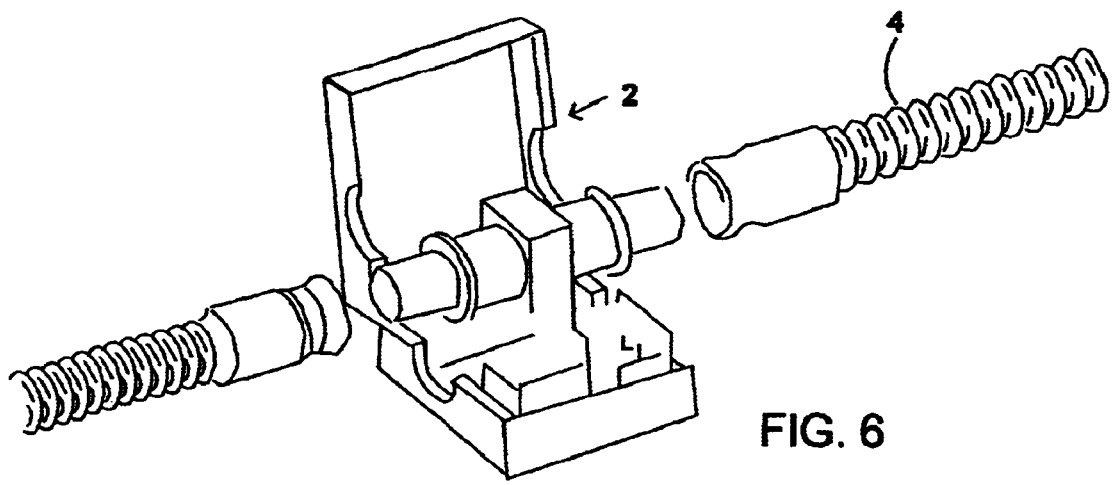
FIG. 6 shows how a preferred flow monitor fits into a respirator tube.

A first preferred embodiment of the present invention is shown in FIG. 1. An optical respirator flow monitor 2 represented by components within the dashed lines in FIG. 1 is substituted for a section of respirator breathing tube 4 as shown also in FIG. 6. Heating elements 6A and 6B are located on the patient side and the respirator side of the optical portion of the monitor. Diode laser system 8 produces a collimated coherent laser beam at a wavelength of 633 nm. Beam splitter 10 and mirror 12 separate the single beam from the laser system into two beams 14A and 14B both of which pass through windows 16A and 16B and the flowing fluid the flow rate of which is to be monitored. Interference fringes are produced in both beams 14A and 14B by shear plates 18A and 18B as shown in FIG. 1A.

Figure 1B:
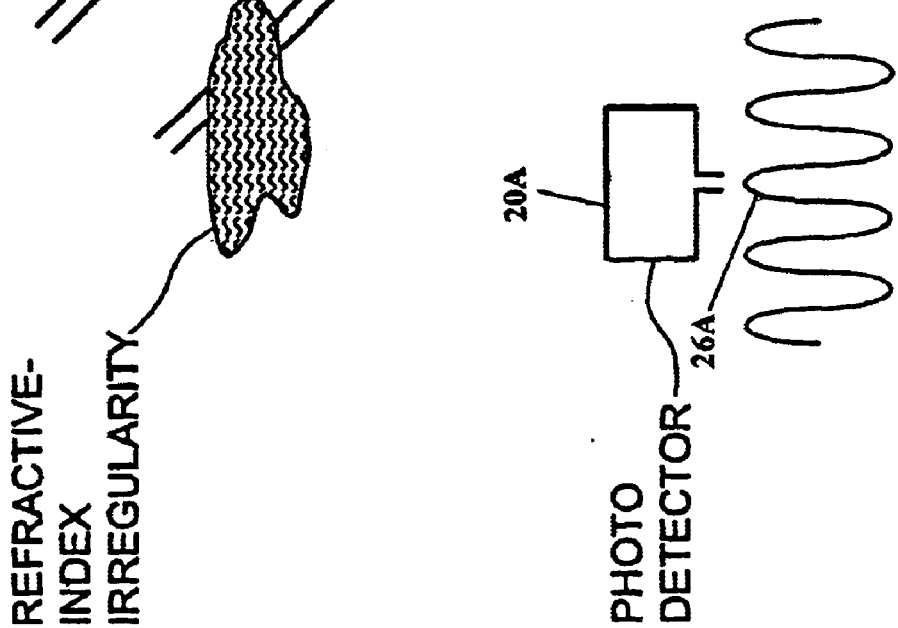
FIG. 1B shows a detector positioned to monitor only the peak intensity of a fringe.

Detectors 20A and 20B are photodiode detectors and each are positioned to monitor the spectral intensity of a single selected interference fringe as shown in FIG. 1B. The spatial separation of beams 14A and 14B is precisely measured. An analog-to-digital converter board 22 converts both sets of signals to digital and these signals are correlated by digital processor 24 to determine the time difference between similar fringe intensity patterns and from these time difference values and the known spatial separation of the two beams the respirator flow and direction is determined. In this preferred embodiment Applicant used a single mode diode laser: 5 mW, 633 nm wavelength, 8 mm beam diameter, available from Power Tech. Inc., Part Number: PM(LD1212)TC5. The detectors each were a silicon photodiode: SiPIN, 1 mm diameter, 1 ns response time, available from Thorlabs Inc., Part Number: FDS010. The receiver aperture diameter was 1 mm. FIG. 1A is a sketch showing how shear plate 18A produces fringe patterns 26. Detector 20A is positioned to monitor only the peak intensity of only one of these fringes such as fringe 26A as shown in FIG. 1B.

Oscilloscope Data

Figure 2A:
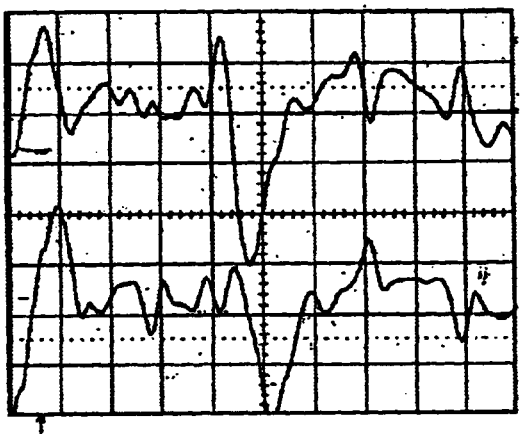
FIGS. 2A, 2B and 2C are copies of oscilloscope traces showing actual fringe intensity signals and demonstrating the ease of correlating the fringe data to determine flow rates.
Figure 2B:
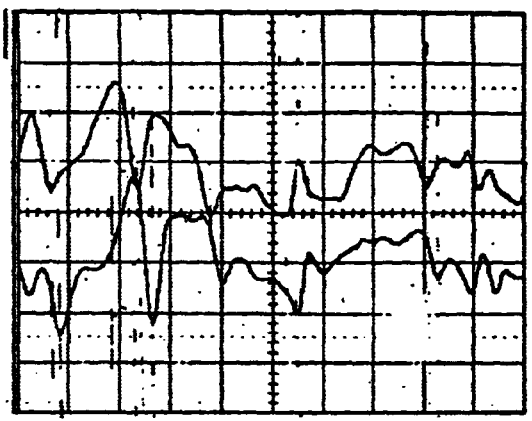
Figure 2C:
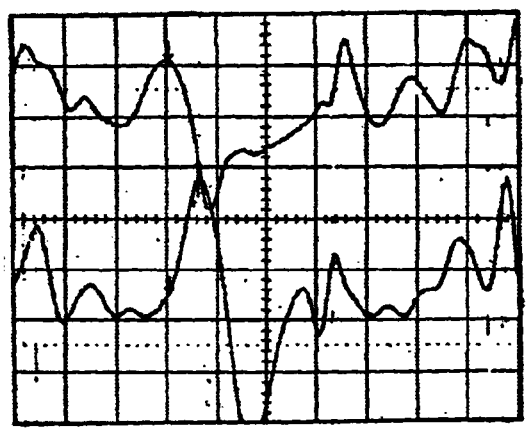
Figure 3A:
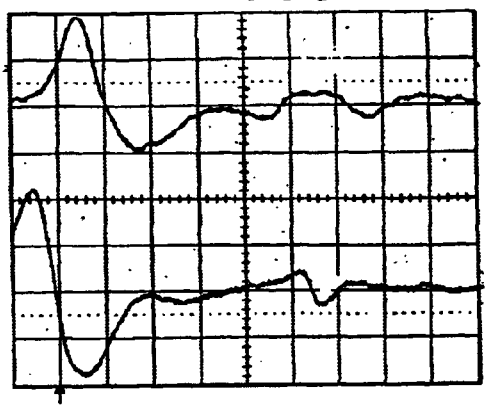
FIGS. 3A and 3B are oscilloscope traces showing inhale and exhale traces showing the two-way accuracy of the present invention.
Figure 3B:
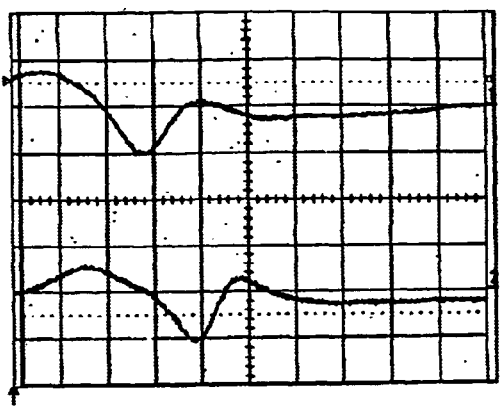
Figure 4:
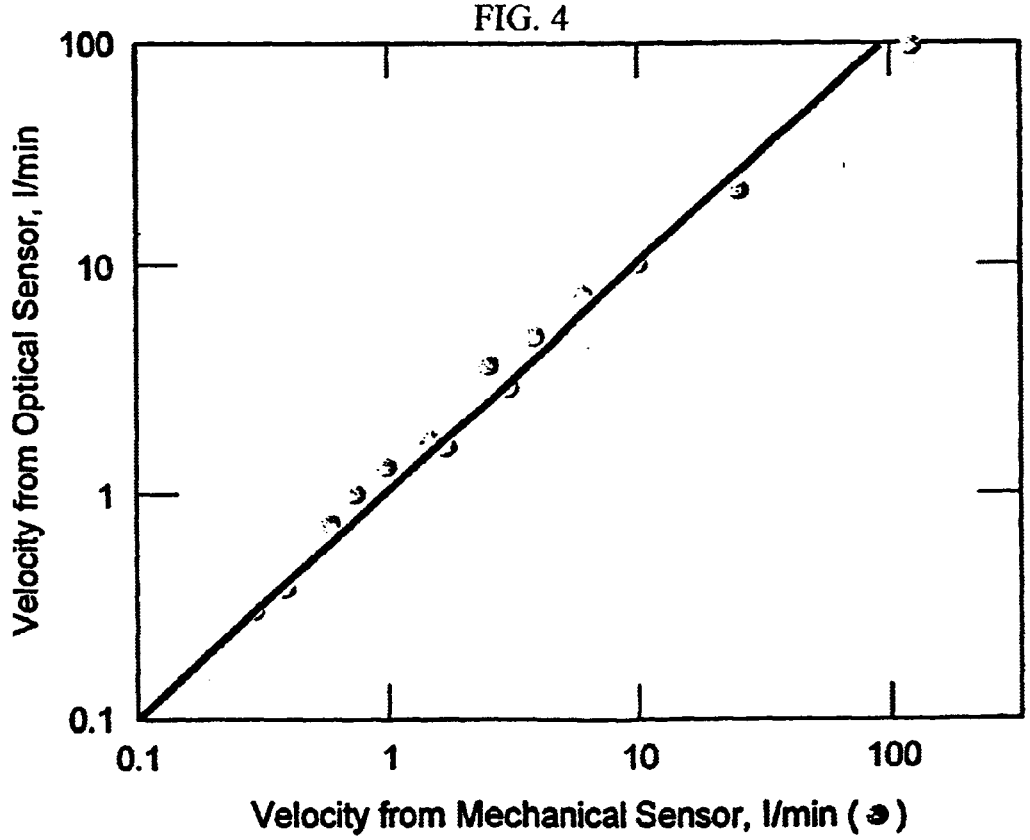
FIG. 4 shows a calibration of the present invention against a mechanical flow device.

Applicant has proven the effectiveness of the present invention by monitoring the output signals of detectors 20A and 20B with an oscilloscope. Typical traces are shown in FIGS. 2A, 2B and 2C. These charts show traces with respirator flow at 4.5 l/min, 6.8 l/min and 16.8 l/min. In these cases the correlations between the similar patterns are obvious and the flow rates can be confirmed manually by an operator. FIGS. 3A and 3B show similar traces with a comparison between inhale and exhale to prove that this invention works equally well for flow in either direction. FIG. 4 is a chart, which compares test results from the present invention with a prior art mechanical sensor showing that the flow measurements correlate in the range from less than one litter/min to more than 100 litters/min.

Cross-Correlations

Figure 5:
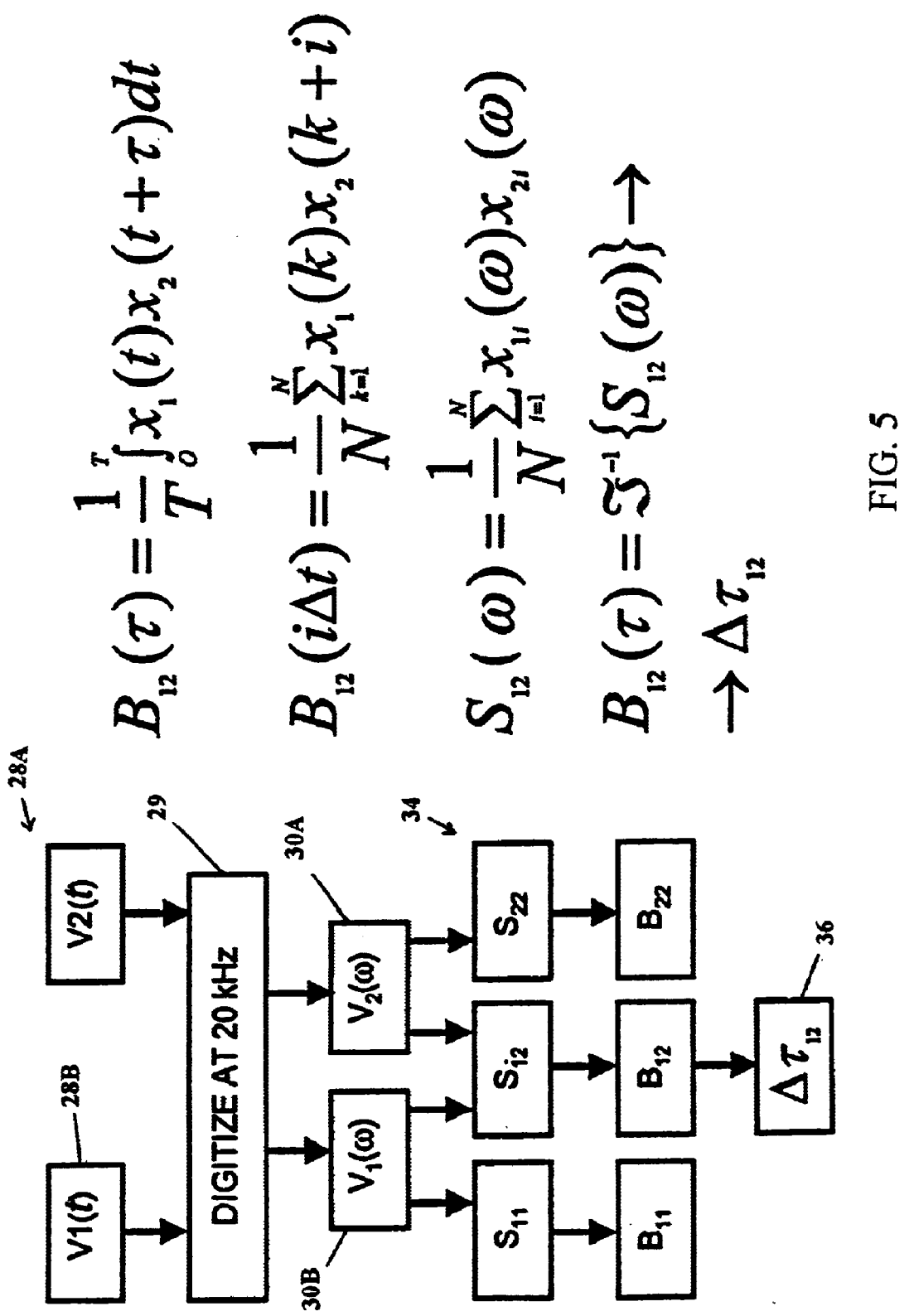
FIG. 5 shows a block diagram and basic equation for making a cross-correlation of two sets of spectral interference fringe data to determine flow rate.

FIG. 5 shows a preferred technique for making the correlations automatically with a digital computer. The two analog signals V1(t) and V2(t) as shown at 28A and 28B are digitized as shown at 29 in FIG. 5 with A to D converter board 22. The signals are then converter to frequency signals V1($\omega$) and V2($\omega$) using a FFT algorithm as shown at 30A and 30B. Then the auto spectra $S_{11}$ and $S_{22}$ are computed and the signals are correlated to compute the cross-spectrum $S_{12}$ as shown at 32. An inverse Fourier transform is then performed on the cross-spectrum as shown at 34 and the time delay $\Delta t$ of the peak of the cross-correlation is determined as shown at 36. The processor then calculates and displays the respirator flow rate as r/$\Delta t$, where r is the distance between two detectors.

Cross-Spectra

Flow direction and flow velocity is determined by calculating the phase spectrum and coherence spectrum of the intensities of the interference fringes caused by the same turbulent inhomogeneities passing each of the two paths. The flow direction is determined by the sign of the phase delay between intensity values in two measurement channels and the flow velocity is determined from the ratio $$V = \frac{2\pi f r}{\theta},$$

where r is the distance between two detectors, $$f = \frac{2\pi}{\omega}$$

is the frequency, and $\theta$ is the phase spectrum of the intensity values in two measurement channels. The cross-spectrum of the signals acquired with two spaced detectors is a Fourier transform of the cross-correlation function $$S_{12}(r, f) = \frac{1}{2\pi} \int_{-\infty}^{\infty} B_{12}(r, \tau) \exp[-i2\pi f \tau] \, d\tau$$

where r is the distance between two detectors, f is the frequency, $B_{12}(r,\tau)$ is the time-lagged cross-correlation function. The cross-spectrum is the complex value $$S_{12}(r,f) = \gamma(r,f) \exp[-i\theta(r,f)]$$

where $\gamma(r,f)$ is the modulus called the coherence spectrum, and $\theta(r,f)$ is the phase spectrum. The phase spectrum determines the phase delay between two signals and relates to the flow velocity V by equation $$\theta(r, f) = \frac{2\pi r f}{V}$$

Therefore, the flow velocity is given by $$V = \frac{2\pi r f}{\theta(r, f)}.$$

Zero Crossing Points Method

The physical meaning of this equation is the following. Let us select in the moving pattern of optical turbulent disturbances a Fourier component with a spatial period $\Lambda$. If this component is moved with flow velocity V, then at two locations separated at distance r the frequency component with temporal frequency f=$\Lambda$V will have a phase shift of $\theta=2\pi f \Delta t$, where $\Delta t=r/V$. Therefore, the flow velocity is determined by $$V = \frac{2\pi f r}{\theta}.$$

The flow direction may be determined by calculating the cumulative difference between the values of the positive part of the cross-correlation function to the negative part thereof, whereby the direction of the flow is defined by the sign of the result of calculation and flow velocity is determined by computing for each of said signals the number of zero crossing points. The number of times the instantaneous signal cross the average signal in each detector using a proper calibration function is converted to the flow velocity. Since the number of zero crossing is a measure of the temporal spectrum of the measured signal, which is proportional to the flow rate, it is clear that the flow rate can be estimated by using the zero crossing points method. This method has an advantage that it is insensitive to evolution of optical disturbances between two spaced locations.

For more details concerning preferred cross-correlation and cross-spectral techniques, the reader is referred to one of the following texts:

1. Bendat J. and Piersol A., Engineering applications of correlation and spectral analysis. NY. Willey, 1980, and 1993 (2nd addition).
2. Bendat J. and Piersol A., Random data: Analysis and measurement procedures. NY. Willey, 1974.
3. Jenkins G. and Watts D. Spectral analysis and its application, 1969.
4. Jackson, L. B. Digital Filters and Signal Processing. Third Ed. Boston: Kluwer Academic Publishers, 1989.
5. Kay, S. M. Modem Spectral Estimation. Englewood Cliffs, N.J.: Prentice Hall, 1988.
6. Oppenheim, A. V., and R. W. Schafer. Discrete-Time Signal Processing. Englewood Cliffs, N.J.: Prentice Hall, 1989.

In summary preferred techniques for making these cross correlations is as follows:

1) Detect the intensity of the laser beam with two detectors, separated at the distance equal to the width of the interference fringes and positioned at the peaks of the neighboring fringes.
2) Process the analog output signal of each detector by amplifying its signal, converting the analog signal to digital and inputting the digital signal into a computer processor.
3) Calculating the average and normalized signal values for each detector to produce a time series for each detector,
4) Calculating the normalized time-lagged cross-correlation function between intensity values for the two time series, and
5) Determine the time delay of the peak of the normalized time-lagged cross correlation function between intensity values measured with the two detectors. The direction of the flow is determined by the sign of the time delay and the flow velocity is determined by the ratio of the separation between the detectors to the peak time delay of the cross correlation function.

Single Laser Beam

Figure 7:
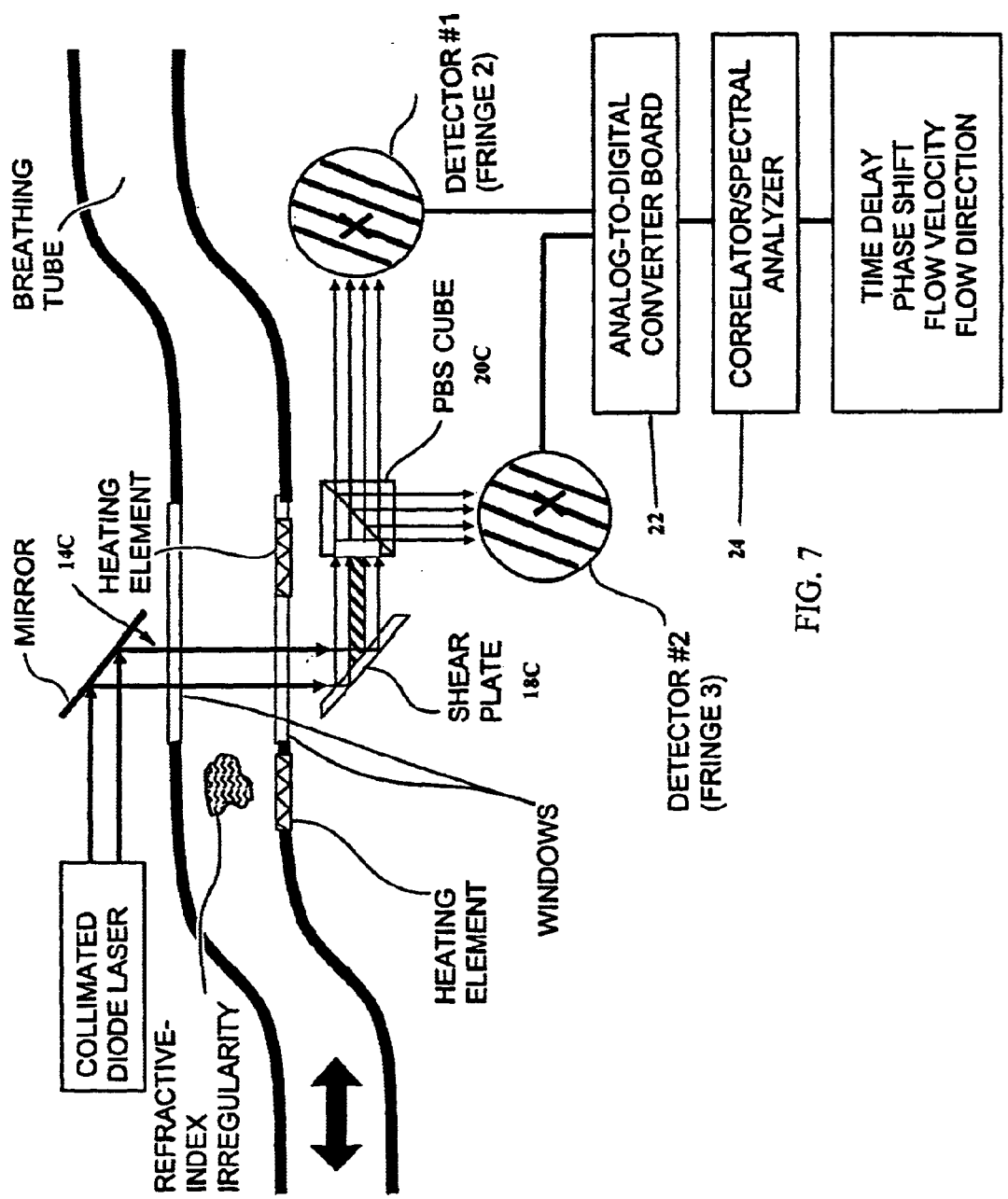
FIG. 7 shows a technique for practicing the present invention by using separate portions of a single laser beam to monitor fluid flow.

FIG. 7 shows another preferred embodiment of the present invention. In this case only one laser beam from laser diode 8A passes through the flowing fluid. The single beam 14C is collimated and passed through the flowing fluid. A single shear plate 18C is used to produce a large number of fringes. The interfered beam is split into two parts by polarizing beam splitter cube 18D and separate fringes are monitored by detector 20A and detector 20B, each detector looking at only one fringe. The two monitored fringes are chosen so that they are representative of separate portions of beam 14C, one portion being displaced from the other a measurable amount in the direction of flow. Based on the measurements of fringe intensity flow rates are determined as described above.

Use of Photo Diode Array Detector

In another preferred embodiment a 1024-pixel photo diode array replaces the beam splitter and the two detectors. The photo diode array will preferably be positioned such that about 4 to 7 pixels cover each fringe. One or more pixels could then be used to monitor two spaced apart fringes as the flow is varied in and our. Correlation can be made either manually as described above or with the cross-correlation algorithm as described above.

Two Types of Flow Measurements for Each Breath

Figure 8:
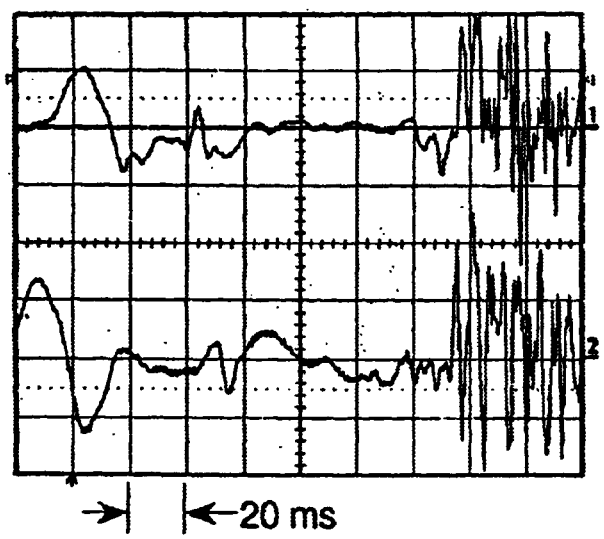
FIG. 8 present charts explaining a technique for measuring flow using two different methods.

FIG. 8 are oscilloscope charts of two intensity of two fringes during the first 0.2 second of respirator flow during a breathing cycle. Note that during the first part of the cycle there is good correlation between the two charts. Also note that during the last 50 ms on the charts correlation is poor. However, Applicant has determined that during this last portion the variations of the signals from the fringe intensity values are proportional to the flow velocity. Therefore, in a preferred embodiment, two different techniques are used to measure flow. During the first part of the cycle correlations are made as described above using the two sets of fringe data and correlating them to obtain the flow rate and direction. During the latter part of the breathing cycle each of the sets of fringe data are analyzed separately. The data are first smoothed such as by making running averages of about 5 intensity values. The average values are then normalized and the average is subtracted from each normalized value and the results plotted. The numbers of zero crossings are then counted and the flow rate is estimated based on the number of zero crossing. Applicant has determined that there is good correlation between the numbers of zero crossings counted and the flow rate during the later part of the breathing cycle.

While the above description contains many specifications, the reader should not construe these as a limitation on the scope of the invention, but merely as exemplifications of preferred embodiments thereof. For example, the present invention could be applied for many other applications other than respirators. These include industrial applications where gas flow monitoring is important. Also, the present invention could be applied to monitor liquid as well as gas flow. Many medical applications require monitoring of respiratory gases in breathing circuits. Measurements of flow rate in combination with gas concentration measurements are useful for variety of diagnostic procedures, titration treatment, calculations of consumption parameters, patient safety monitoring, as well as monitoring high end and military breathing systems. Respiratory monitoring in needed in particular, to provide alarms that alert the patient's attendants to a significant change in condition in order to insure the timely implementation of lifesaving measures. Accurate flow sensors are used in diagnostic settings in association with other measurements (breath rate, gas concentrations, heart rate, temperature) to calculate various pulmonary and cardiac function parameters. The main requirements of the respiratory monitoring systems from the primary users are performance, including measurement accuracy, operating range, repeatability, convenience, reliability, easy cleaning, low maintenance and low cost.

Accordingly the reader is requested to determine the scope of the invention by the appended claims and their legal equivalents, and not by the examples given above.

What is claimed is:

1. A device for measuring flow of a fluid comprising:
   A) a laser and laser optics configured to direct laser beams produced by said laser through a flowing fluid to produce a flow perturbed laser beam,
   B) an interference producing means for producing interference patterns in said flow perturbed laser beam,
   C) two optical detectors defining a first detector configured to monitor at least one interference fringe defining a first interference fringe and a second detector configured to monitor at least one interference fringe other than said first interference fringe, D) a correlation means for correlating data from said first and second detectors to determine flow rate of said fluid.

2. A device as in claim 1 wherein said laser optics define a beam crossing location where said beam passes through said flowing fluid and further comprising at least one heating element configured to heat said fluid upstream of said crossing location.

3. A device as in claim 2 wherein said fluid flow is alternately in opposite directions, defining a forward direction and a reverse direction, wherein said at least one heating element is two heating elements, one located upstream of said crossing location with flow in the forward direction and the other located upstream with flow in the reverse direction.

4. A device as in claim 1 wherein said correlation means comprises an oscilloscope for comparing fringe data.

5. A device as in claim 1 wherein said correlation means comprises analog to digital converter and a digital processor programmed to perform cross-correlation analysis to compare fringe data and to calculate flow velocity and direction from results of said cross correlations.

6. A device as in claim 1 wherein said correlation means comprises analog to digital converter and a digital processor programmed to perform cross-spectral analysis to compare fringe data and to calculate flow velocity and direction from results of said cross spectrum.

7. A device as in claim 1 wherein said correlation means comprises analog to digital converter and a digital processor programmed to perform cross-correlation analyses to compare low frequency fringe data to calculate flow velocity and direction from results of said cross-correlation for the onset of the flow and to perform running average and compute the number of zero crossing points per interval for high frequency fringe data to calculate the flow rate for the subsequent portion of the breathing cycle.

8. A device as in claim 1 wherein said device is configured to monitor flow of a respirator.

9. A method as in claim 7 wherein an oscilloscope is utilized to compare said information from said two detectors.

10. A method as in claim 7 wherein said information from said two detectors are compared using an analog to digital converter and a digital processor configured with an algorithm to perform cross correlations.

11. A method as in claim 7 wherein said information from said two detectors are compared using an analog to digital converter and a digital processor configured with an algorithm to perform cross spectral analysis.

12. A method as in claim 7 wherein said information from said two detector are compared using an analog to digital converter and a digital processor is configured with an algorithm to perform cross correlation analysis to determine the flow velocity and flow direction at the onset of the flow during a portion of a breathing cycle and, during a subsequent portion of the breathing cycle to smooth the signal fluctuations in each array of said values by performing running averages of 4–8 values and to compute the number of zero crossing points during selected time intervals to calculate flow rate for the subsequent portion of the breathing cycle.

13. A method of monitoring flow of a fluid comprising the following steps:
A) producing optical perturbations in said flow at a first location,
B) transmitting a laser beam through said flow downstream of said first location to produce a perturbed laser beam,
C) measuring perturbations in at least two separate portions of said perturbed laser with at least two detectors, and
D) comparing information from said at least two detectors to determine said flow.

* * * * *